United States Patent

[11] 3,540,369

| [72] | Inventor | Holly M. Brooks, now change of name by marriage Holly Brooks Hice, Guttenberg, New Jersey |
|---|---|---|
| [21] | Appl. No. | 594,780 |
| [22] | Filed | Nov. 16, 1966 |
| [45] | Patented | Nov. 17, 1970 |
| [73] | Assignee | By mesne assignments to Vari-Phase, Inc. Lauderdale-by-the-Sea, Florida a corporation of Florida |

[54] COOKING SUPPORT FOR SHRIMP
2 Claims, 6 Drawing Figs.

[52] U.S. Cl. ........................................ 99/426, 99/111, 99/441
[51] Int. Cl. ........................................ A47j 43/18
[50] Field of Search ........................................ 99/426, 352, 354, 409, 427—8, 432, 440, 441, 442, 111, 188, 340, 349; 249/91, 92; 211/126, 181

[56] References Cited
UNITED STATES PATENTS

| 2,752,846 | 7/1956 | Lucas | 99/441 |
| 2,907,470 | 10/1959 | Abresch | 211/126 |
| 3,050,073 | 8/1962 | McMillan | 211/181X |
| 3,363,542 | 1/1968 | Swanson et al. | 99/441 |
| 3,411,432 | 11/1968 | Willett | 99/440 |
| 2,684,625 | 7/1954 | Trunk | 99/441 |
| 3,019,721 | 2/1962 | Haapala | 99/349 |
| 3,181,453 | 5/1965 | Moran | 99/349 |
| 3,308,748 | 3/1967 | Jalbert | 99/426 |
| 3,363,544 | 1/1968 | Eriksen | 99/426 |

Primary Examiner—Walter A. Scheel
Assistant Examiner—Arthur O. Henderson
Attorney—Hofgren, Wegner, Allen, Stellman and McCord ABSTRACT: A food support for use in the cooking of shrimp to preclude the curling thereof. A tray formed of wire rods is provided with a plurality of upwardly extending guides running along the tray. The guides are formed of parallel rods fastened to a set of parallel rods having identical undulating configurations. An additional set of rods is utilized to support shrimp in an upright condition with their ventral surface in contact with the upper surface of the guides.

Patented Nov. 17, 1970 3,540,369
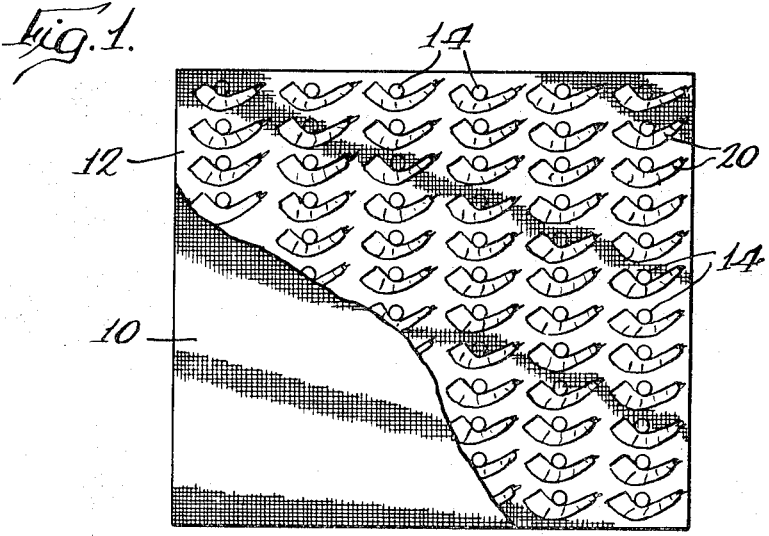
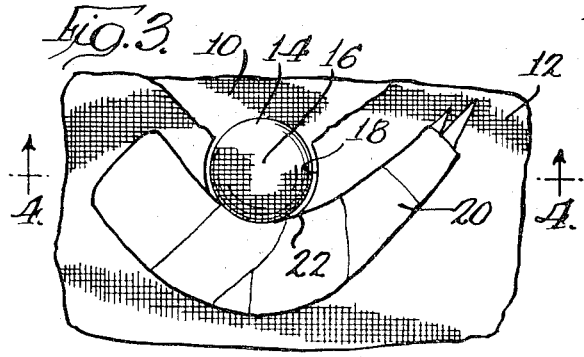
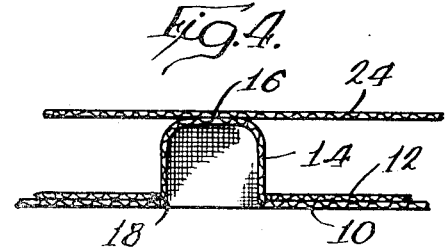
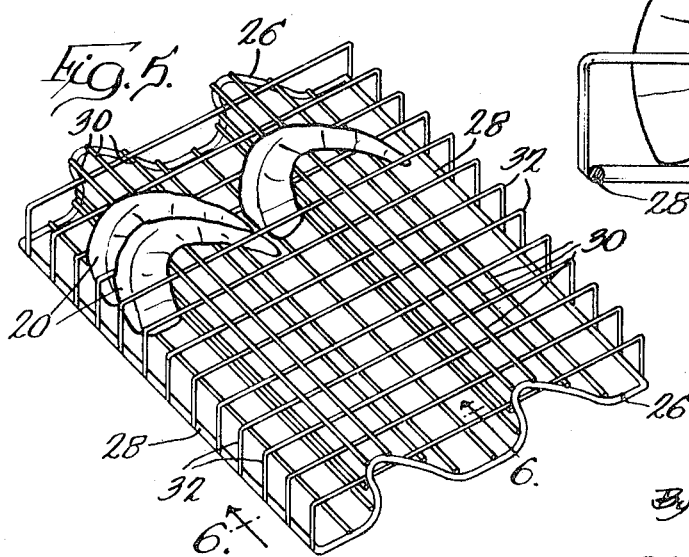
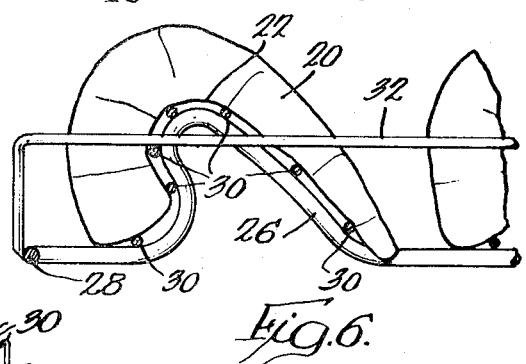
Inventor:
Holly M. Brooks
By Hofgren, Wegner,
Allen, Stellman & McCord
Attys

COOKING SUPPORT FOR SHRIMP

This invention relates to cooking peeled shrimp, and more particularly it relates to means for controlling the curling of peeled shrimp during a cooking operation.

It is well known in the food industry that shrimp which are peeled or shelled when raw curl into tight circles during subsequent cooking. This is true whether the shrimp are cooked immediately after peeling or frozen and cooked at some later time. The same shrimp cooked "in the shell" and subsequently peeled do not curl up and consequently have a more pleasing appearance. Because they are not curled up, the shrimp actually look larger. Shrimp with uniform large radii of curvature are considered the most desirable.

Mechanical shrimp peelers have been available for shrimp processing for some time, but these devices cannot be used on cooked shrimp. Where the traditional "cooked in the shell" appearance is desired for dishes such as shrimp cocktail, a high labor cost must be borne to have the shrimp hand-peeled after cooking.

It is therefore a primary object of the present invention to provide a means for use in cooking peeled shrimp which eliminates excessive curling of the shrimp.

Another object is to provide a device for use in cooking peeled shrimp whereby they attain a uniformity of curl superior to shrimp "in the shell".

A further object of this invention is to provide a device for use in cooking shrimp which allows the use of a mechanical peeler and results in shrimp which have the uncurled appearance of hand-peeled shrimp "cooked in the shell".

Another object of this invention is to provide a traylike structure with tubular guides against which the inner edges of the peeled shrimp are positioned horizontally to control the amount of their curling.

Another object of this invention is to provide a traylike structure with guides composed of sets of parallel rods against which the inner edges of the upright shrimp are positioned.

Other objects and advantages of the invention will be apparent from the following description taken in conjunction with the accompanying drawings in which:

FIG. 1 is a partially sectional top view of one embodiment of the invention;

FIG. 2 is an elevational view of the embodiment shown in FIG. 1 from which the shrimp have been omitted;

FIG. 3 is a partially sectional view showing part of the embodiment of FIG. 1 in detail;

FIG. 4 is a sectional view taken along line 4—4 of FIG. 3;

FIG. 5 is a perspective view of a second embodiment of the present invention; and FIG. 6 is a sectional view taken along line 6—6 of FIG. 5.

The heat of cooking causes peeled shrimp to curl into a tight circle around their concave side or inner edge. The present invention teaches how to control the amount of this curling by limiting the amount of open area along this inner edge. The disclosed method of holding the inner edge of the shrimp in a configuration which approximates its natural uncurled configuration to limit the amount of curling and to provide a uniform curl in each shrimp may be implemented by innumerable means. The means disclosed in this invention consists basically of a cooking tray provided with curl control guides against which the inner edges of the shrimp are placed and supported and against which the shrimp can curl only to a limited extent as cooking heat is applied.

In the first embodiment of the invention, shown in FIGS. 1—4, a rectangular cooking tray is comprised of a generally flat base member 10 and a removal tray 12. A plurality of evenly spaced apart tubular curl control guides 14 are stamped in the base member 10 and extend upwardly therefrom. These guides are shown as knoblike protuberances having circular configurations and flat tops 16. The invention is not limited to the illustrated configuration but includes any configuration effective to control the curling of the shrimp during a cooking operation.

The removal tray 12, a generally flat structure with apertures 18 corresponding in size and location to the tubular guides 14, is positioned on the base member 10 with the guides 14 protruding through the apertures 18. The shrimp 20 are positioned horizontally on this removal tray 12 with their inner edges 22 against the tubular guides 14. When cooking heat is applied, the curl of the shrimp 20 is controlled by these guides 14 and their inner edges 22 may assume their configuration.

A flat traylike restraining means 24 is positioned on the tops 16 of the tubular guides 14 above the removal tray 12 and the shrimp 20. This restraining tray prevents the shrimp from turning over or lifting off of the removal tray 12 during the cooking operation.

All three trays and the tubular guides in the present embodiment are illustrated as being formed of wire mesh. While wire mesh has proved effective, any material or materials which can perform its functions may be substituted for it.

The removal tray 12 is not required to control the curl of the shrimp but it does provide a convenient device in conjunction with the restraining means 24 for removing the shrimp 20 from the guides 14 of the base member 10 after they have been cooked and for transporting them for further processing. The device will control the curl of the shrimp without the removal tray 12 if the shrimp 20 are positioned directly on the base member 10 with their inner edges 22 against the tubular guides 14.

In a second embodiment of the present invention, shown in FIGS. 5 and 6, a rectangular cooking tray is formed from a pair of parallel wire rods 26 of identical undulating configuration and a pair of parallel wire connecting rods 28 fastened at their ends to the rods 26.

Sets of wire rods 30 positioned parallel to the connecting rods 28 with their ends secured to the undulating rods 26 perpendicular to the planes of undulation, form the guides upon which the shrimp 20 are positioned. Only two such guides are illustrated but more can be provided by increasing the length of the undulating rods 26 and multiplying the number of guide forming rods 30.

In this embodiment, the shrimp 20 are located in an upright position with their inner edges 22 resting on the guide forming rods 30. The shape of the guides is determined by the configuration of the undulating rods 26 and when cooked, the inner edges 22 of the shrimp 20 assume the configuration of these guides. While the configuration illustrated has proved suitable, the invention is not limited to this, but includes any shape which approximates the natural configuration of the shrimp or the desired final shape.

The shrimp 20 are supported in their upright position and prevented from moving laterally along the guides by support means consisting of a plurality of evenly spaced apart wire rods 32. These rods 32 are positioned transverse to the guide forming rods 30 and at a level about midway vertically of the shrimp. The ends of these rods are bent downwardly and fastened to the connecting rods 28.

The shrimp are first cleaned by removing their shells. Although they may be cleaned by hand, the present invention allows the use of available mechanical peelers to perform this operation.

The second step may be accomplished by loading the shrimp on the cooking tray. If a tray similar to the first embodiment of this invention is used, the shrimp 20 are supported by placing their inner edges 22 touching or in close proximity to the tubular guides 14 on the tray 12 if it is used, or on the base member 10. After the entire tray has been loaded the restraining tray 24 is positioned on the tops 16 of the guides 14.

If a cooking tray similar to the second embodiment is used for supporting the shrimp, the shrimp are supported by positioning them between the support rods 32 in an upright position with their inner edges 22 on the guides formed by the rods 30.

The loaded tray is then placed in a cooking apparatus (not shown) and the shrimps are cooked. Further processing such as washing or refrigeration may be performed before the shrimp are removed from the tray.

A tray of the first embodiment can be unloaded by removing the restraining tray 24 and inverting the cooking tray, then allowing the force of gravity to cause the shrimp 20 to become disengaged from the guides 14. However, if the removal tray 12 has been used, a preferred method of unloading consists of lifting the removal tray 12 and the restraining tray 24 with the shrimp 20 sandwiched therebetween off of the guides 14 of base member 10.

Unloading the tray of the second embodiment may be accomplished by inverting it and allowing gravity to cause the shrimp 20 to become disengaged from its guides.

I claim:

1. A device for supporting peeled shrimp during the cooking thereof and for restraining the curling thereof comprising means for defining a tray for receiving a plurality of shrimp to be cooked and guide means within said tray having a plurality of shrimp engaging curl restraining portions for engaging the inner edges of a plurality of peeled shrimp along a substantial part of the same so that the peeled shrimp, after cooking, will have a larger radii of curvature than if cooked without restraint, said guide means being formed in the surface of said tray means and extending horizontally along said tray means and being comprised of sets of parallel rods, said parallel rods being fastened to a set of parallel rods with identical undulating configurations.

2. A device for supporting peeled shrimp during the cooking thereof and for restraining the curling thereof comprising means for defining a tray for receiving a plurality of shrimp to be cooked and guide means within said tray having a plurality of shrimp engaging curl restraining portions for engaging the inner edges of a plurality of peeled shrimp along a substantial part of the same so that the peeled shrimp, after cooking, will have a larger radii of curvature than if cooked without restraint, said guide means being formed in the surface of said tray means and extending horizontally along said tray means, and further including support means for supporting shrimp in an upright position and preventing the same from moving laterally along said guide means, said support means being comprised of a plurality of parallel rods positioned transverse to said guide means between and at a level about midway vertically of the shrimp.